US009206954B2

(12) United States Patent
Aiso et al.

(10) Patent No.: US 9,206,954 B2
(45) Date of Patent: Dec. 8, 2015

(54) LIGHT SOURCE UNIT AND VEHICULAR LAMP

(75) Inventors: Yoshiaki Aiso, Shizuoka (JP); Ryujiro Ikuta, Shizuoka (JP); Takashi Matsunaga, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 299 days.

(21) Appl. No.: 12/951,626

(22) Filed: Nov. 22, 2010

(65) Prior Publication Data

US 2011/0128754 A1 Jun. 2, 2011

(30) Foreign Application Priority Data

Nov. 30, 2009 (JP) ................................ 2009-271395

(51) Int. Cl.
*B60Q 1/00* (2006.01)
*F21S 8/10* (2006.01)
*F21V 19/00* (2006.01)

(52) U.S. Cl.
CPC ........... *F21S 48/1154* (2013.01); *F21V 19/001* (2013.01)

(58) Field of Classification Search
CPC ... F21S 48/1154; F21V 10/001; F21V 19/001
USPC .......................... 362/547, 545, 294, 373, 800
See application file for complete search history.

(56) References Cited

U.S. PATENT DOCUMENTS

| | | | | |
|---|---|---|---|---|
| 5,746,497 | A | 5/1998 | Machida | |
| 6,411,022 | B1 | 6/2002 | Machida | |
| 7,210,833 | B2 * | 5/2007 | Gasquet et al. | 362/548 |
| 7,290,911 | B2 | 11/2007 | Tsukamoto et al. | |
| 2007/0109806 | A1 * | 5/2007 | Tsukamoto et al. | 362/545 |

FOREIGN PATENT DOCUMENTS

| | | | |
|---|---|---|---|
| JP | 08-339707 | A | 12/1996 |
| JP | 2001-063454 | A | 3/2001 |
| JP | 2003101072 | A | 4/2003 |
| JP | 2004319121 | A | 11/2004 |

(Continued)

OTHER PUBLICATIONS

English abstract of JP8339707 published on Dec. 24, 1996, espacenet database, 1 page.
English abstract of JP2001063454 published on Mar. 13, 2001, espacenet database, 1 page.
English abstract of JP2005310584 published on Nov. 4, 2005, espacenet database, 1 page.

(Continued)

*Primary Examiner* — Anh Mai
*Assistant Examiner* — Jessica M Apenteng
(74) *Attorney, Agent, or Firm* — Osha Liang LLP

(57) ABSTRACT

A vehicular lamp includes a light source unit that is attached to one of a lamp body and a reflector. The light source unit includes a semiconductor light emitting element that is a light source; a plurality of conductive members formed into a predetermined three-dimensional shape by press working a conductive metal material; and a housing that is formed of an insulating material. The plurality of conductive members each include: an element mounting portion to which the semiconductor light emitting element is mounted, a heat dissipating portion that dissipates heat generated when the semiconductor light emitting element emits light, and a connecting portion to which a connector that supplies power to the semiconductor light emitting element is connected. The housing holds the plurality of conductive members in a spaced apart state.

14 Claims, 9 Drawing Sheets

(56) References Cited

FOREIGN PATENT DOCUMENTS

| | | | |
|---|---|---|---|
| JP | 2005-310584 | A | 11/2005 |
| JP | 2006310088 | A | 11/2006 |

OTHER PUBLICATIONS

Office Action Issued in Japanese Application No. 2009271395, Dated: Sep. 9, 2013 (4 Pages With English Translation).

* cited by examiner

LIGHT SOURCE UNIT AND VEHICULAR LAMP

BACKGROUND OF INVENTION

1. Field of the Invention

The present invention relates to a light source unit and a vehicular lamp. More specifically, the present invention relates to a technical field in which a plurality of conductive members, which have an element mounting portion on which a semiconductor light emitting element is mounted and a heat dissipating portion that dissipates heat generated when the semiconductor light emitting element emits light, are held by a housing.

2. Related Art

There is a light source unit that uses a semiconductor light emitting element such as a light emitting diode (LED) as a light source. Such a light source unit is provided in a vehicular lamp that irradiates light radiated from the light source as illumination light, for example (see Patent Documents 1 to 3, for example).

The light source units described in Patent Documents 1 to 3 use a plurality of semiconductor light emitting elements, and are also provided with a power supply member for supplying power to the semiconductor light emitting element, a circuit board that is mounted with the plurality of semiconductor light emitting elements, a flexible printed wiring board that is connected to a power supply circuit that supplies power to the semiconductor light emitting element, and the like.

[Patent Document 1] Japanese Patent Application Laid-Open (Kokai) No. 8-339707

[Patent Document 2] Japanese Patent Application Laid-Open (Kokai) No. 2001-63454

[Patent Document 3] Japanese Patent Application Laid-Open (Kokai) No. 2005-310584

SUMMARY OF INVENTION

Recent advances in technologies related to semiconductor light emitting elements have achieved an improvement in the brightness of light radiated from one semiconductor light emitting element, thus reducing the number of semiconductor light emitting elements and enabling semiconductor light emitting elements to be used as various types of light sources.

For example, it is now possible to configure a vehicular lamp using one semiconductor light emitting element as a light source. In such case, however, if other components besides the semiconductor light emitting element are provided, as in the light source units described in the above Patent Documents 1 to 3, the structure becomes complicated and hinders attempts to reduce manufacturing costs.

If the semiconductor light emitting element is used as a light source, a large amount of heat is generated when the semiconductor light emitting element emits light. Therefore, it is also necessary to secure a high heat dissipation property.

Accordingly, one or more embodiments of a light source unit and a vehicular lamp according to the present invention achieve a simplified structure and secure a high heat dissipation property.

A light source unit, in one or more embodiments, includes: a semiconductor light emitting element that is a light source; a plurality of conductive members formed into a predetermined three-dimensional shape by press working a conductive metal material, wherein the plurality of conductive members each comprise: an element mounting portion to which the semiconductor light emitting element is mounted, and a heat dissipating portion that dissipates heat when the semiconductor light emitting element emits light; and a housing formed of an insulating material, wherein the housing holds the plurality of conductive members in a spaced apart state.

A vehicular lamp, in one or more embodiments, includes a light source unit that is attached to a lamp body or a reflector. The light source unit includes: a semiconductor light emitting element that is a light source; a plurality of conductive members formed into a predetermined three-dimensional shape by press working a conductive metal material, wherein the plurality of conductive members each comprise: an element mounting portion to which the semiconductor light emitting element is mounted, a heat dissipating portion that dissipates heat when the semiconductor light emitting element emits light, and a connecting portion to which a connector that supplies power to the semiconductor light emitting element is connected; and a housing formed of an insulating material, wherein the housing holds the plurality of conductive members in a spaced apart state.

Therefore, the light source unit and the vehicular lamp have a structure in which the plurality of conductive members formed of a conductive metal material is held by a housing formed of an insulating material, and heat generated when the semiconductor light emitting element emits light is dissipated by the heat dissipating portion of the conductive member.

A light source unit according to one or more embodiments of the present invention is characterized by including: a semiconductor light emitting element that is a light source; a plurality of conductive members formed into a predetermined three-dimensional shape by press working a conductive metal material, wherein the plurality of conductive members each comprise: an element mounting portion to which the semiconductor light emitting element is mounted, and a heat dissipating portion that dissipates heat when the semiconductor light emitting element emits light; and a housing that is formed of an insulating material, wherein the housing holds the plurality of conductive members in a spaced apart state.

Therefore, a simplified structure can be achieved because the conductive member is formed by press working the conductive metal material and held by the housing. In addition, a high heat dissipation property can be secured when the semiconductor light emitting element emits light because the conductive member is provided with the heat dissipating portion.

According to one or more embodiments of the invention, the conductive member is formed by bending a metal plate that is used as the conductive metal material. Therefore, the conductive member can be easily formed and the light source unit can be reduced in weight.

According to one or more embodiments of the invention, the housing is formed with an engagement groove, and the conductive member is provided with an elastically deformable engagement projecting portion that engages with the engagement groove. Therefore, an operation to join the conductive member to the housing can be easily accomplished.

According to one or more embodiments of the invention, the housing is provided with a cover portion that covers at least a part of the heat dissipating portion of the conductive member.

Accordingly, when attaching the light source unit to a predetermined attachment portion, there is no risk of an operator performing the attachment operation coming into contact with the heat dissipating portion formed of a metal material. Thus, improved safety when attaching the light source unit can be achieved.

A vehicular lamp according to one or more embodiments of the present invention includes a light source unit that is attached to a lamp body or a reflector. The vehicular lamp is characterized in that the light source unit includes: a semiconductor light emitting element that is a light source; a plurality of conductive members formed into a predetermined three-dimensional shape by press working a conductive metal material, wherein the plurality of conductive members each comprise: an element mounting portion to which the semiconductor light emitting element is mounted, a heat dissipating portion that dissipates heat when the semiconductor light emitting element emits light, and a connecting portion to which a connector that supplies power to the semiconductor light emitting element is connected; and a housing that is formed of an insulating material, wherein the housing holds the plurality of conductive members in a spaced apart state.

Therefore, in one or more embodiments, a simplified structure can be achieved because the conductive member is formed by press working the conductive metal material and held by the housing. In addition, in one or more embodiments, a high heat dissipation property can be secured when the semiconductor light emitting element emits light because the conductive member is provided with the heat dissipating portion.

Other aspects and advantages of the invention will be apparent from the following description, the drawings and the claims.

DETAILED DESCRIPTION

Hereinafter, a light source unit and a vehicular lamp in accordance with embodiments of the present invention will be described with reference to the accompanying drawings.

Figure 1:
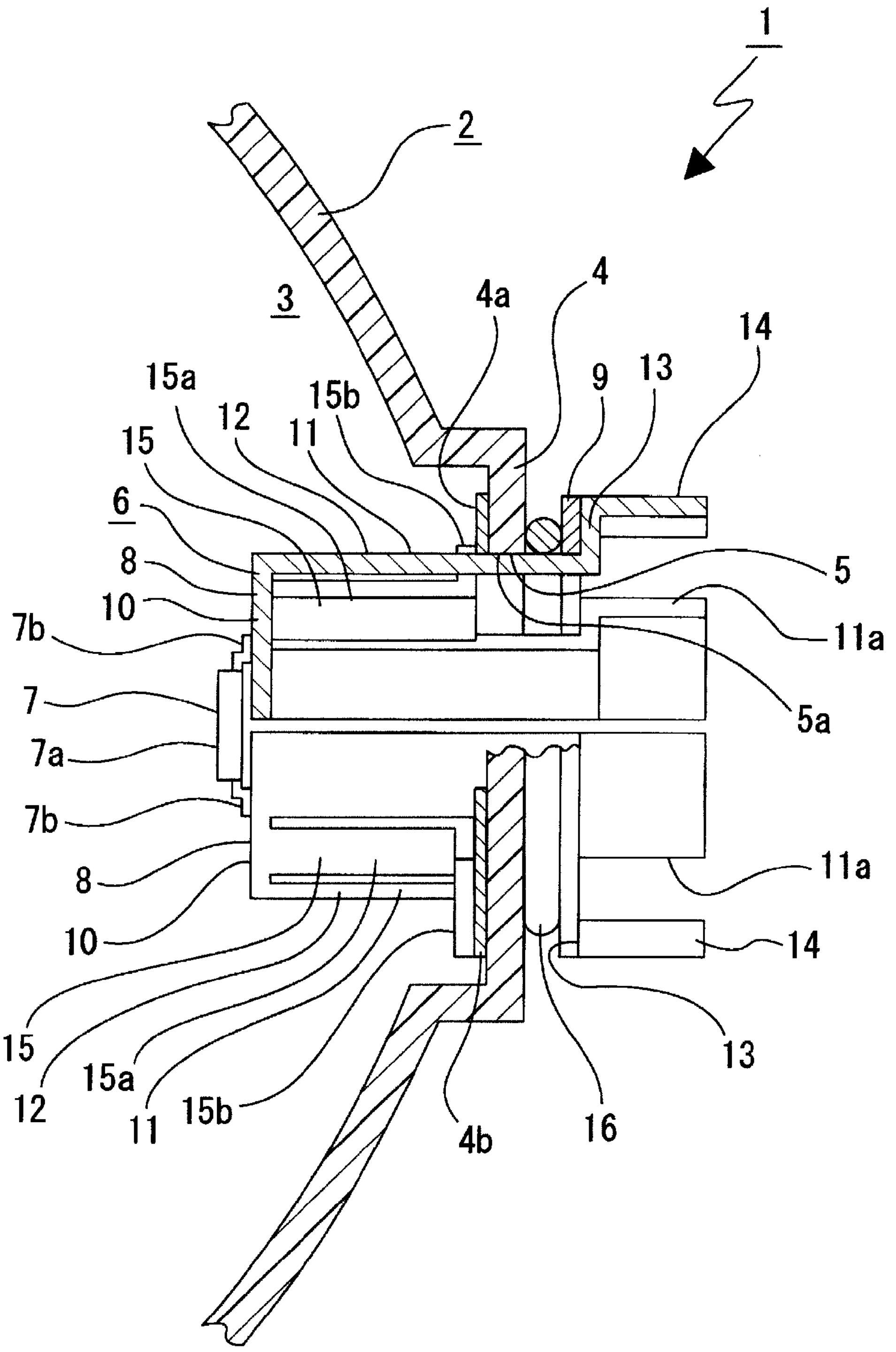
FIG. 1 is a cross-sectional view that shows a state in which a light source unit is attached to an attachment portion of a lamp body according to a first embodiment.

A vehicular headlamp 1, as FIG. 1 shows, includes a lamp body 2 (or a reflector 2) that has a concave portion opening forward, and a cover not shown in the drawing that closes the front opening face of the lamp body 2. A space formed from the lamp body 2 and the cover is formed as a lamp chamber 3.

Figure 2:
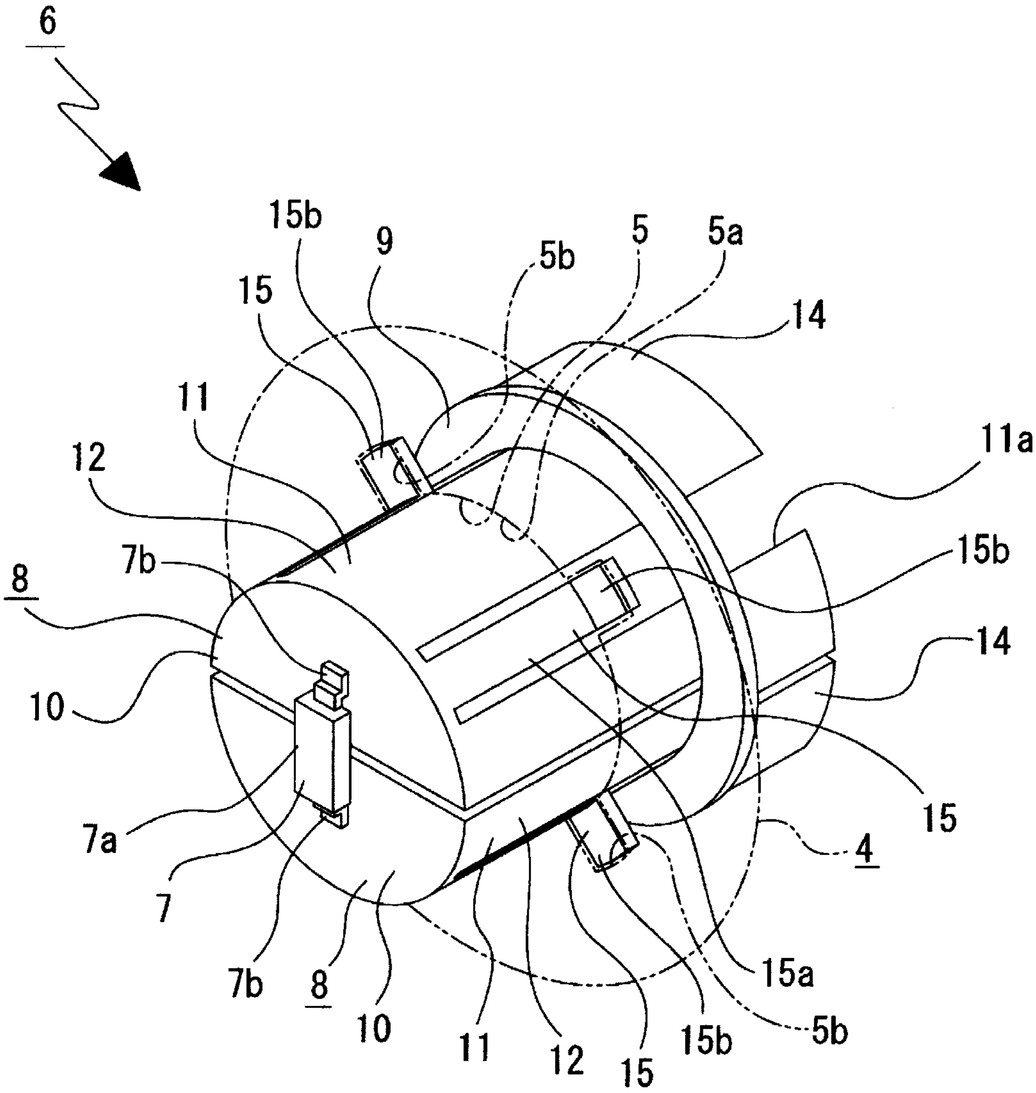
FIG. 2 is an enlarged perspective view of the light source unit according to the first embodiment.

The lamp body 2 has a rear end portion that is provided with a plate-like attachment portion 4, and the attachment portion 4 is formed with an attachment hole 5. As shown in FIG. 2, the attachment hole 5 is formed from a large circular portion 5*a*, and projecting portions 5*b*, 5*b*, . . . that are formed continuous from an outer circumference of the circular portion 5*a*. The projecting portions 5*b*, 5*b*, . . . are positioned spaced in the circumferential direction.

The attachment portion 4 has a front surface that is formed with connecting terminals 4*a*, 4*b*. The connecting terminals 4*a*, 4*b* are connected to connector terminals (not shown in the drawing) that are provided on a back surface side of the lamp body 2. The connector terminal is connected to a connector that is connected to a power supply circuit (not shown in the drawing).

A light source unit 6 according to a first embodiment, which is attached to the lamp body 2, will be described below (see FIGS. 1 to 3).

The light source unit 6 is attached to the attachment portion 4 of the lamp body 2 (see FIG. 1).

Figure 3:
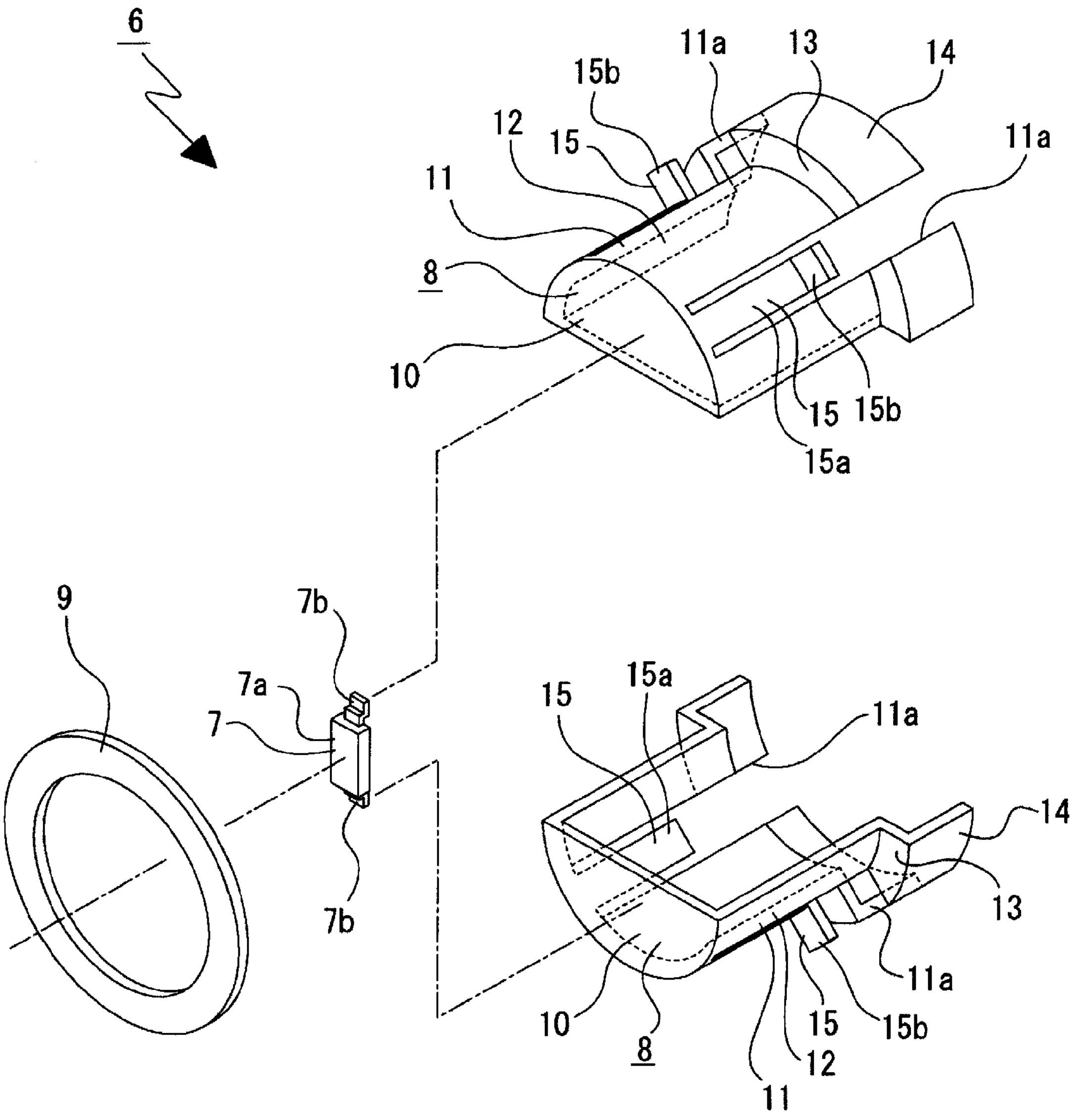
FIG. 3 is an exploded perspective view of the light source unit according to the first embodiment.

The light source unit 6 includes a semiconductor light emitting element 7 that is provided as a light source; a pair of conductive members 8, 8 that are formed into a predetermined three-dimensional shape by press working a conductive metal material; and a housing 9 that holds the pair of conductive members 8, 8 and is formed of an insulating material such as resin (see FIGS. 2 and 3).

The semiconductor light emitting element 7 is, for example, a light emitting diode (LED). The semiconductor light emitting element 7 is formed from a light emitting portion 7*a*, and a pair of terminal portions 7*b*, 7*b* that project from the light emitting portion 7*a* in mutually opposite directions.

The conductive member 8 has an element mounting portion 10 and a heat dissipating portion 11.

The element mounting portion 10 is formed into a semicircular shape that faces in the longitudinal direction.

The heat dissipating portion 11 is formed projecting rearward from a curved part among an outer circumferential edge of the element mounting portion 10. The heat dissipating portion 11 has a first circumferential surface portion 12 that is formed into a circular surface shape, an expanded portion 13 that expands outward from a rear edge of the first circumferential surface portion 12, and a second circumferential surface portion 14 that projects rearward from an outer circumferential edge of the expanded portion 13.

The heat dissipating portion 11 is formed with oblong notches 11*a*, 11*a* opening rearward that are spaced in the circumferential direction. Connecting portions 15, 15 are also provided respectively positioned in the notches 11*a*, 11*a*. The connecting portion 15 is formed from a base portion 15*a* that longitudinally extends, and a connection projecting portion 15*b* that projects outward from a rear end portion of the base portion 15*a*. The base portion 15*a* has a front end that is connected to a front end portion of the first circumferential surface portion 12.

The housing 9 is formed into an annular shape, and is joined to front surfaces of the expanded portions 13, 13 of the conductive members 8, 8 (see FIG. 2). The housing 9 may be integrally formed with the conductive members 8, 8 by so-called outsert molding, wherein melted resin is injected into and molded in a die in which a metal member is arranged. Alternatively, the housing 9 may be formed separate from the conductive members 8, 8 and joined by adhesion or the like to the conductive members 8, 8.

By joining the conductive members 8, 8 to the housing 9, the conductive members 8, 8 are held by the housing 9. In a state where the conductive members 8, 8 are held by the housing 9, the conductive members 8, 8 are arranged spaced with respective inner surfaces of the first circumferential surface portions 12, 12 and the second circumferential surface portions 14, 14 facing one another, such that a fixed gap is formed between the conductive members 8, 8.

In the state where the conductive members 8, 8 are held by the housing 9, the terminal portions 7*b*, 7*b* of the semiconductor light emitting element 7 are respectively joined by laser welding, for example, to the element mounting portions 10, 10 of the conductive members 8, 8.

The light source unit 6 configured as described above is inserted from behind into the attachment hole 5 formed in the attachment portion 4 of the lamp body 2, with an O-ring 16 arranged on a front surface of the housing 9. In the light source unit 6, the first circumferential surface portion 12 of the conductive members 8, 8 is inserted into the circular portion 5*a* of the attachment hole 5, and the connection projections 15*b*, 15*b*, . . . of the conductive members 8, 8 are respectively inserted into the projecting portions 5*b*, 5*b*, . . . of the attachment hole 5 (see FIG. 2).

In a state where the connection projecting portions 15*b*, 15*b*, . . . are respectively inserted into the projecting portions 5*b*, 5*b*, . . . of the attachment hole 5, the O-ring 16 is pressed against a rear surface of the attachment portion 4, and in this state, the light source unit 6 is rotated with respect to the attachment portion 4. When the light source unit 6 is rotated with respect to the attachment portion 4, as FIG. 1 shows, the connection projecting portion 15*b* of at least one of the connecting portions 15 of one conductive member 8 is connected to one connecting terminal 4*a* formed on the front surface of the attachment portion 4, and the connection projecting portion 15*b* of at least one of the connecting portions 15 of the other conductive member 8 is connected to the other connecting terminal 4*b* formed on the front surface of the attachment portion 4, thus attaching the light source unit 6 to the lamp body 2.

In a state where the light source unit 6 is attached to the lamp body 2, the expanded portions 13, 13 and the second circumferential surface portions 14, 14 provided as parts of the heat dissipating portions 11, 11 of the conductive members 8, 8 are positioned rearward (on an outer side) of the lamp body 2.

In the state where the light source unit 6 is attached to the lamp body 2, the attachment portion 4 is interposed between the connection projecting portions 15*b*, 15*b*, . . . of the conductive members 8, 8 and the housing 9 through the O-ring 16, thus securing a state of stable attachment of the light source unit 6 to the lamp body 2.

In the state where the light source unit 6 is attached to the lamp body 2 as described above, current is supplied from the power supply circuit to the semiconductor light emitting element 7 through the connector, the connector terminal, the connecting terminals 4*a*, 4*b*, and the conductive members 8, 8, such that light is radiated from the light emitting portion 7*a* of the semiconductor light emitting element 7.

Heat is generated in conjunction with the radiation of light when the semiconductor light emitting element 7 emits light. However, the generated heat passes from the element mounting portions 10, 10 of the conductive members 8, 8 through the heat dissipating portions 11, 11, and is released to outside the lamp body 2.

A light source unit 6A according to a second embodiment, which is attached to the lamp body 2, will be described next (see FIGS. 4 to 6).

Figure 4:
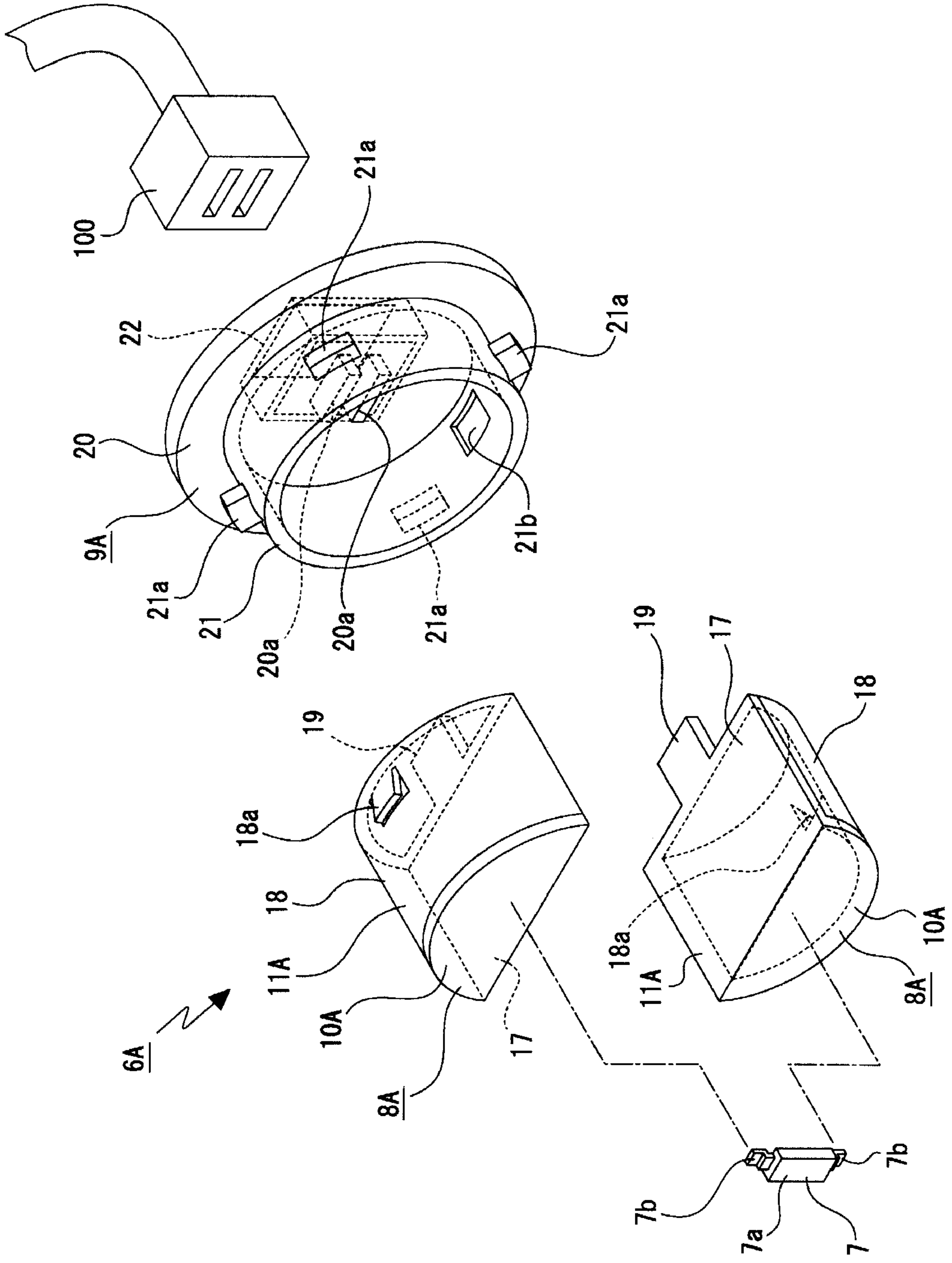
FIG. 4 is an exploded perspective view of a light source unit according to a second embodiment.
Figure 5:
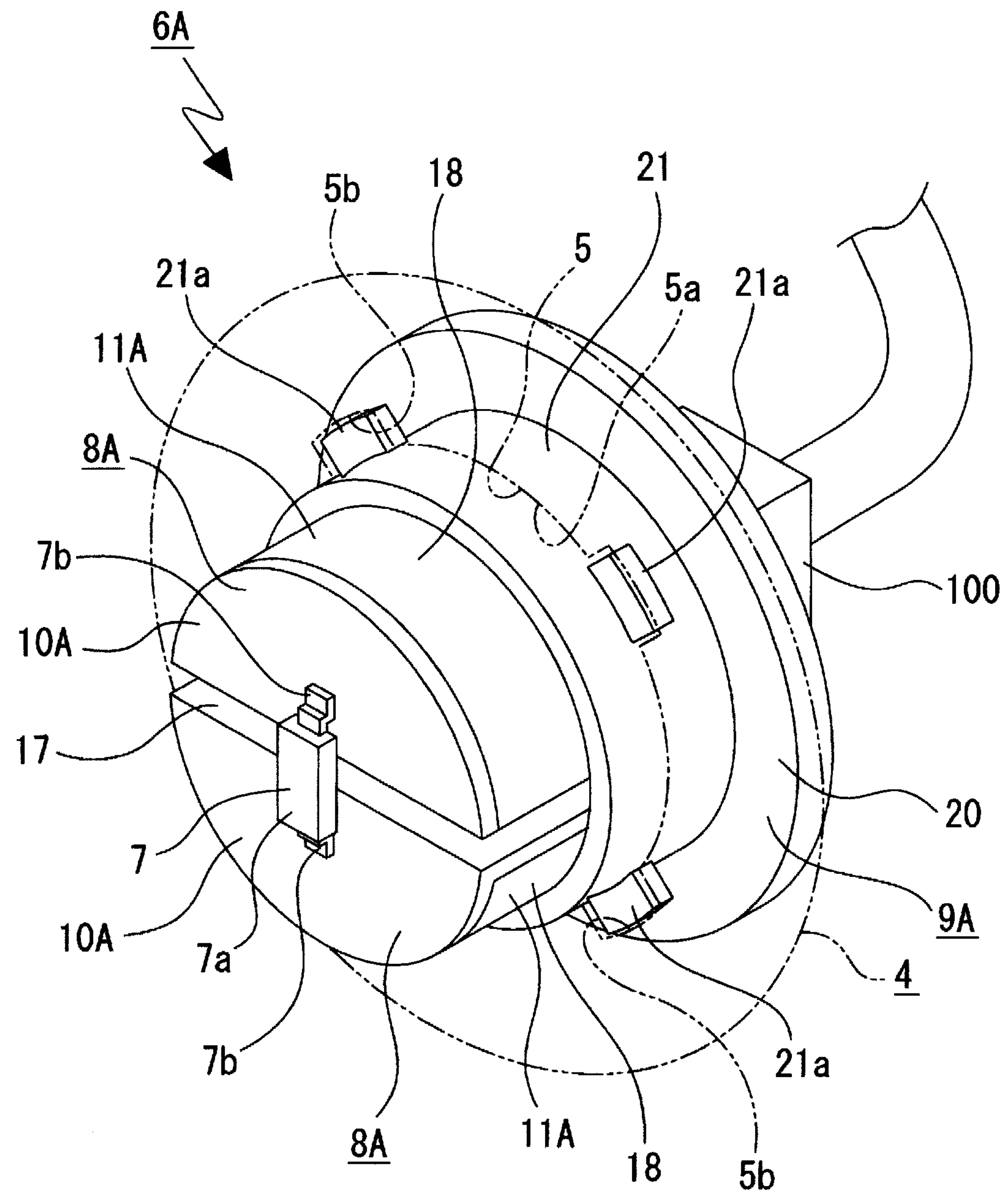
FIG. 5 is an enlarged perspective view of the light source unit according to the second embodiment.
Figure 6:
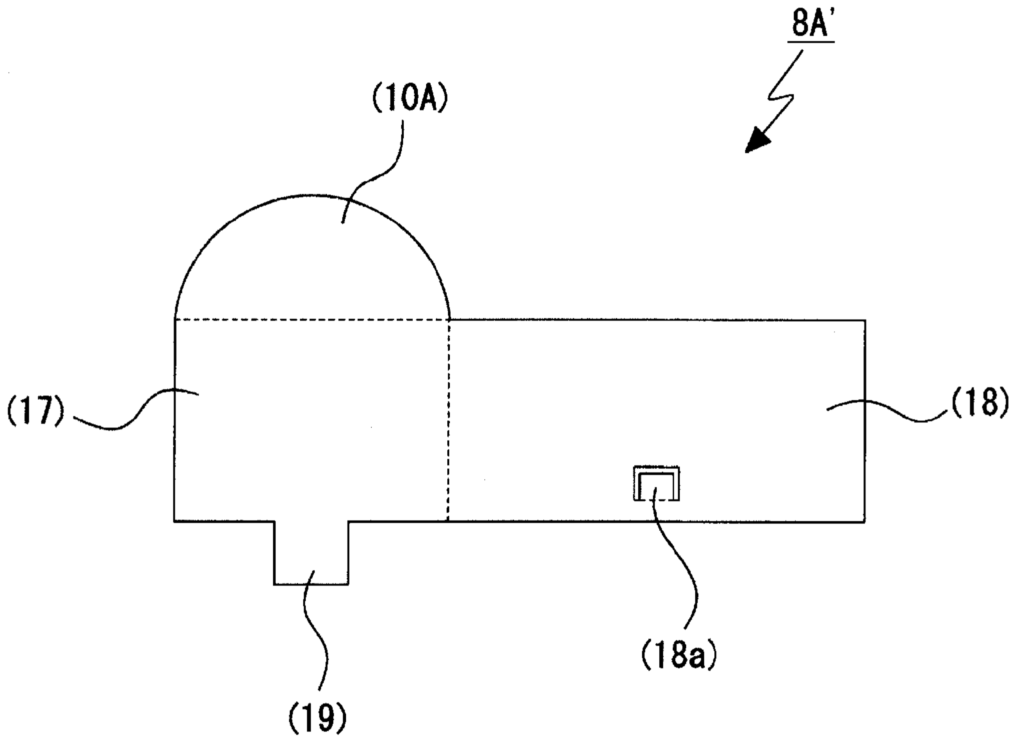
FIG. 6 is a frontal view that shows a metal plate for forming a conductive member of the light source unit according to the second embodiment.

The light source unit 6A includes a semiconductor light emitting element 7 that is provided as a light source; a pair of conductive members 8A, 8A that are formed into a predetermined three-dimensional shape by press working a conductive metal material; and a housing 9A that holds the pair of conductive members 8A, 8A and is formed of an insulating material such as resin (see FIGS. 4 and 5).

The conductive member 8A is formed, for example, by bending a metal plate 8A' that is formed into a predetermined shape (see FIG. 6), wherein the conductive member 8A is formed by folding parts of the metal plate 8A' indicated by dashed lines and bending a portion into a circular arc shape.

The conductive member 8A has an element mounting portion 10A and a heat dissipating portion 11A (see FIGS. 4 and 5).

The element mounting portion 10A is formed into a semicircular shape that faces in the longitudinal direction.

The heat dissipating portion 11A has a plate portion 17 that is formed projecting rearward from a linear part among an outer circumferential edge of the element mounting portion 10A, and a circumferential surface portion 18 that is continuous from a side edge of the plate portion 17 and bent into a circular arc shape.

A position toward a rear end of the circumferential surface portion 18 is provided with an engagement projecting portion 18*a* that is formed bent toward an outer side. The engagement projecting portion 18*a* has a rear end that is formed bent and elastically deformable.

The conductive member 8A is provided with a connecting portion 19 that projects rearward from a center portion of a rear edge of the plate portion 17.

The housing 9A is formed by integrating a base portion 20 that is formed into a disc shape that faces in the longitudinal direction, a holding portion 21 that has a cylindrical shape and projects forward from a part toward an outer circumference of the base portion 20, and a connector connecting portion 22 that has a square tubular shape and projects rearward from a center portion of the base portion 20.

The center portion of the base portion 20 is also formed with terminal insertion holes 20*a*, 20*a* that have an oblong shape, and the terminal insertion holes 20*a*, 20*a* pass through the inside of the connector connecting portion 22.

Attachment projecting portions 21*a*, 21*a*, . . . are provided spaced in the circumferential direction on an outer circumferential surface of the holding portion 21. Engagement grooves 21*b*, 21*b* are formed at 180-degree opposite positions on an inner circumferential surface of the holding portion 21.

Rear end portions of the conductive members 8A, 8A are inserted into the holding portion 21 of the housing 9A, and the connecting portions 19, 19 are respectively inserted into the terminal insertion holes 20*a*, 20*a* of the base portion 20. The connecting portions 19, 19 are positioned inside the connector connecting portion 22.

When inserting the conductive members 8A, 8A into the holding portion 21, each of the engagement projecting portions 18*a*, 18*a* slidingly contacts the inner circumferential surface of the holding portion 21 and elastically deforms so as to become displaced toward an inner side. When the elastically deformed engagement projecting portions 18*a*, 18*a* are respectively positioned against the engagement grooves 21*b*, 21*b*, the engagement projecting portions 18*a*, 18*a* elastically return and tip end edges thereof are engaged with the engagement grooves 21*b*, 21*b*.

As described above, the conductive members 8A, 8A are joined to the housing 9A by respectively engaging the engagement projecting portions 18*a*, 18*a* with the engagement grooves 21*b*, 21*b*.

Thus, in the light source unit 6A, by inserting the conductive members 8A, 8A into the holding portion 21, the engagement projecting portions 18*a*, 18*a* are respectively engaged with the engagement grooves 21*b*, 21*b* and the conductive members 8A, 8A are joined to the housing 9A. Therefore, an operation to join the conductive members 8A, 8A to the housing 9A can be easily accomplished.

By joining the conductive members 8A, 8A to the housing 9A, the conductive members 8A, 8A are held by the housing 9A. In a state where the conductive members 8A, 8A are held by the housing 9A, the conductive members 8A, 8A are arranged spaced with the plate portions 17, 17 facing one another, such that a fixed gap is formed between the conductive members 8A, 8A.

In the state where the conductive members 8A, 8A are held by the housing 9A, the terminal portions 7*b*, 7*b* of the semiconductor light emitting element 7 are respectively joined by laser welding, for example, to the element mounting portions 10A, 10A of the conductive members 8A, 8A.

The light source unit 6A configured as described above is inserted from behind into the attachment hole 5 formed in the attachment portion 4 of the lamp body 2, with the O-ring 16 arranged on a front surface of the base portion 20 of the housing 9A. In the light source unit 6A, the conductive members 8A, 8A and the holding portion 21 of the housing 9A are inserted into the circular portion 5*a* of the attachment hole 5, and the attachment projecting portions 21*a*, 21*a*, . . . of the housing 9A are respectively inserted into the projecting portions 5*b*, 5*b*, . . . of the attachment hole 5 (see FIG. 5).

In a state where the attachment projecting portions 21*a*, 21*a*, . . . are respectively inserted into the projecting portions 5*b*, 5*b*, . . . of the attachment hole 5, the O-ring 16 is pressed against the rear surface of the attachment portion 4, and in this state, the light source unit 6A is rotated with respect to the attachment portion 4 to attach the light source unit 6A to the lamp body 2.

In the state where the light source unit 6A is attached to the lamp body 2, the attachment portion 4 is interposed between the base portion 20 and the attachment projecting portions 21*a*, 21*a*, . . . of the housing 9A through the O-ring 16, thus securing a state of stable attachment of the light source unit 6A to the lamp body 2.

In the state where the light source unit 6A is attached to the lamp body 2, a connector 100 is inserted into the connector connecting portion 22 of the housing 9A (see FIG. 4), and the connector 100 is connected to the connecting portions 19, 19 of the conductive members 8A, 8A positioned on the connector connecting portion 22.

In the state where the light source unit 6A is attached to the lamp body 2 as described above, current is supplied from the power supply circuit to the semiconductor light emitting element 7 through the connector 100 and the conductive members 8A, 8A, such that light is radiated from the light emitting portion 7*a* of the semiconductor light emitting element 7.

Heat is generated in conjunction with the radiation of light when the semiconductor light emitting element 7 emits light. However, the generated heat passes from the element mounting portions 10A, 10A of the conductive members 8A, 8A through the heat dissipating portions 11A, 11A, and is released to outside the lamp body 2.

In the light source unit 6A described above, the conductive members 8A, 8A are formed by bending the metal plate 8A'. Therefore, the conductive members 8A, 8A can be easily formed and the light source unit 6A can be reduced in weight.

A light source unit 6B according to a third embodiment, which is attached to the lamp body 2, will be described next (see FIGS. 7 to 9).

Figure 7:
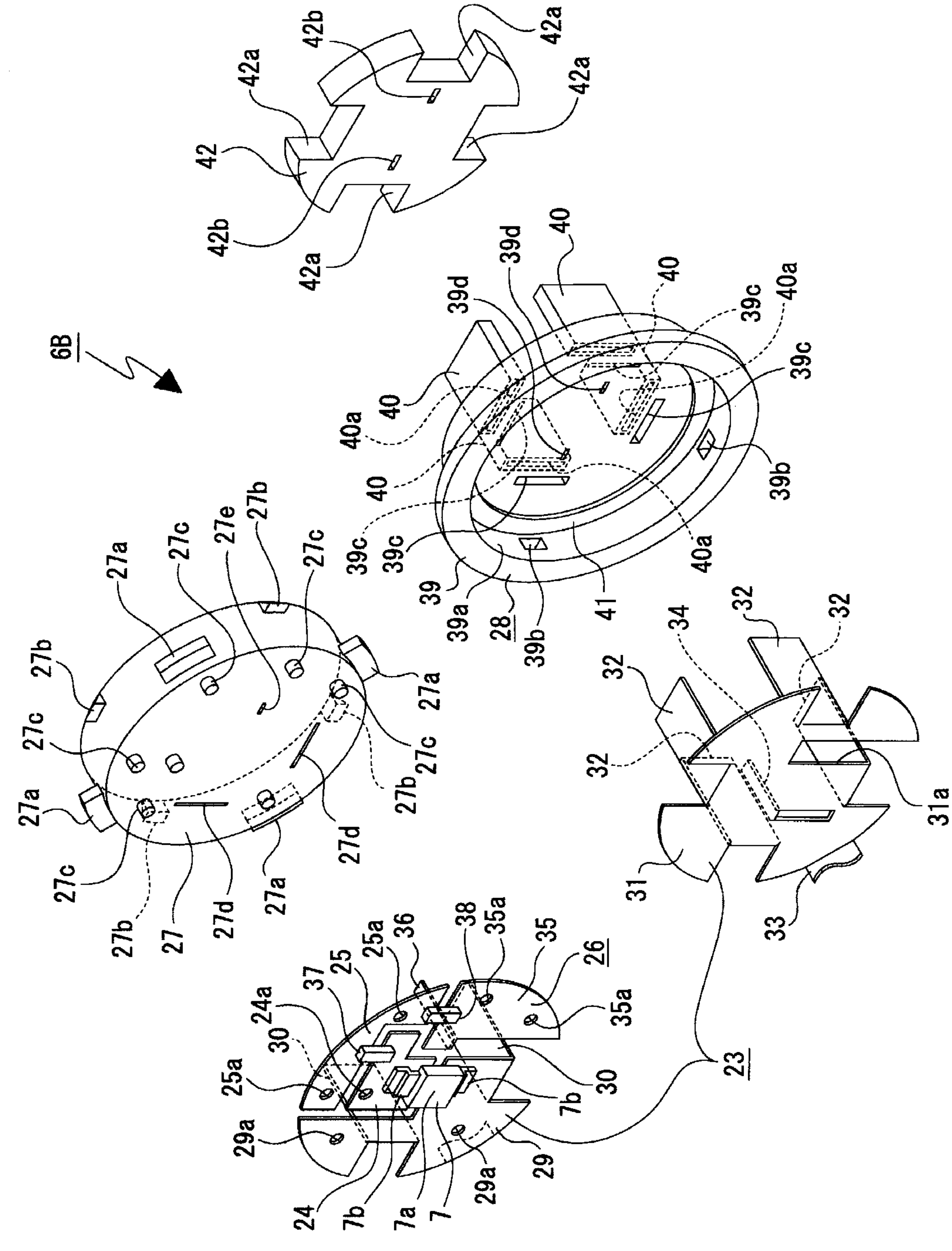
FIG. 7 is an exploded perspective view of a light source unit according to a third embodiment.
Figure 8:
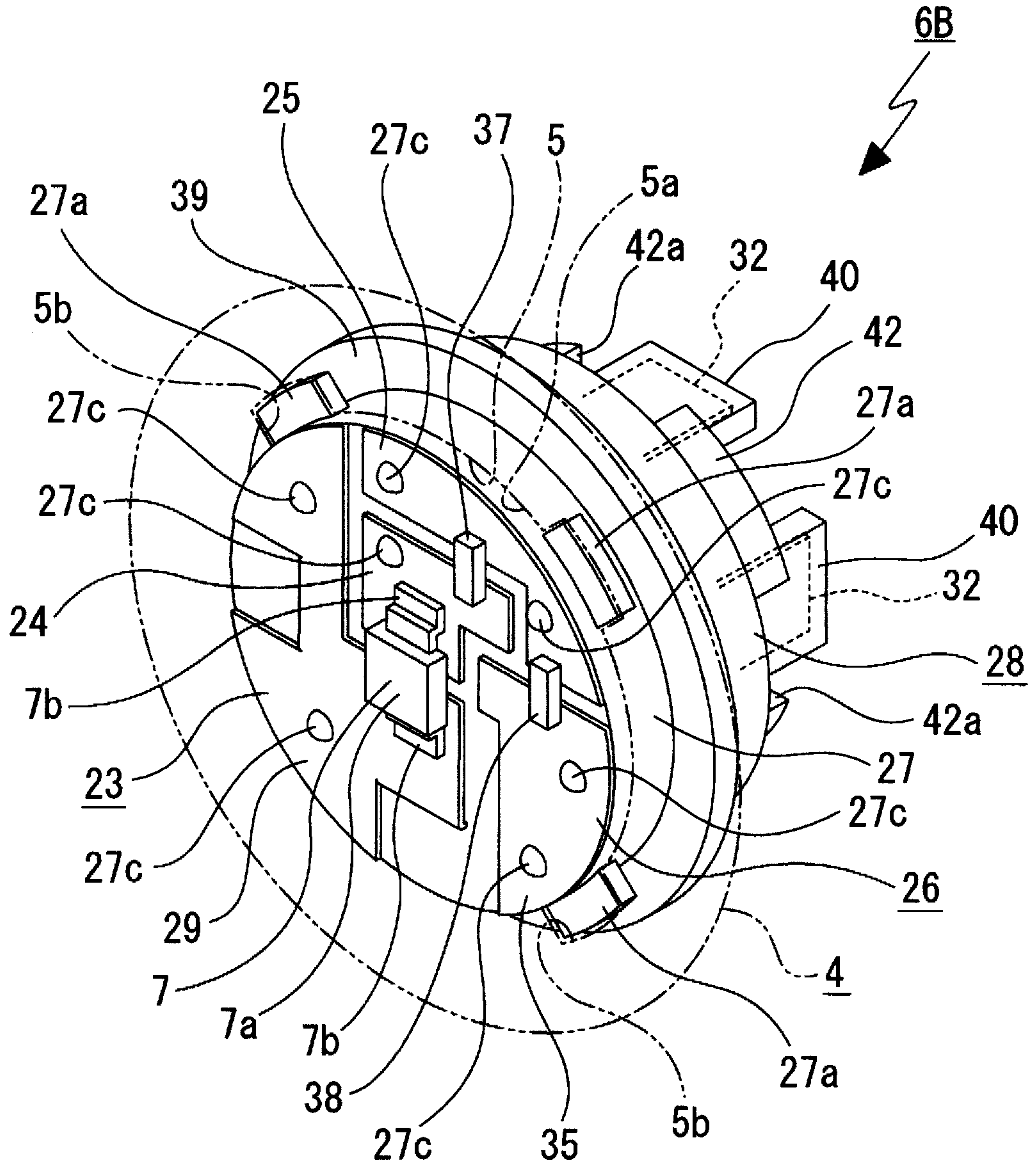
FIG. 8 is an enlarged perspective view of the light source unit according to the third embodiment.
Figure 9:
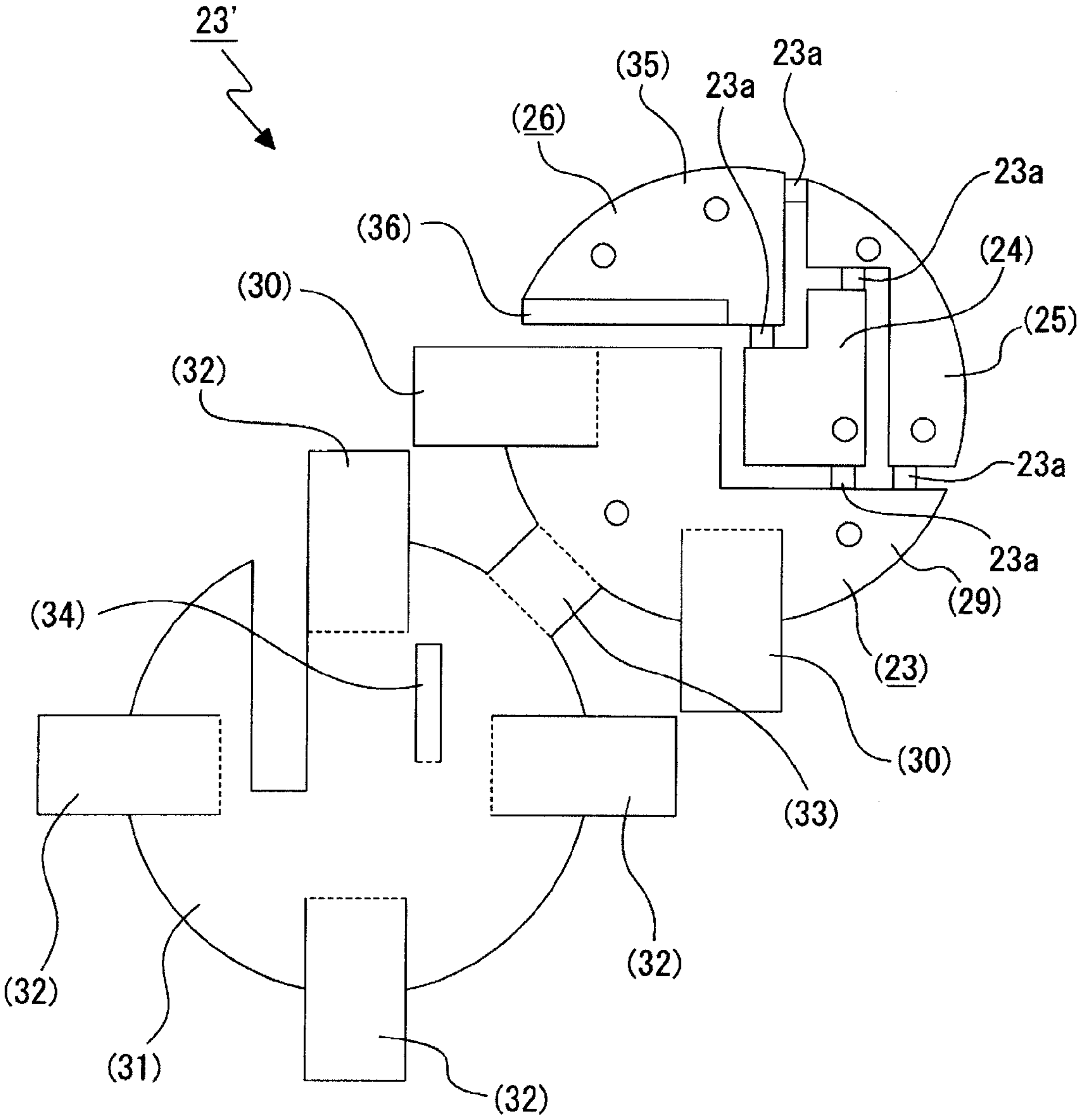
FIG. 9 is a frontal view that shows a metal plate for forming a conductive member of the light source unit according to the third embodiment.

The light source unit 6B includes a semiconductor light emitting element 7 that is provided as a light source; a pair of conductive members 23, 24, 25, 26 that are formed into a predetermined three-dimensional shape by press working a conductive metal material; and a first housing 27 and a second housing 28 that hold the conductive members 23, 24, 25, 26 and are formed of an insulating material such as resin (see FIGS. 7 and 8).

The conductive members 23, 24, 25, 26 are formed, for example, by bending and shearing a metal plate 23' that is formed into a predetermined shape (see FIG. 9), wherein parts of the metal plate 23' indicated by dashed lines are folded and connecting portions 23*a*, 23*a*, . . . are sheared to form the conductive members 23, 24, 25, 26.

The conductive member 23 has an element mounting portion 29 that faces in the longitudinal direction, first heat dissipating portions 30, 30 that are provided folded 90 degrees with respect to the element mounting portion 29, a second heat dissipating portion 31 that is positioned facing rearward of the element mounting portion 29, third heat dissipating portions 32, 32, . . . that are provided folded 90 degrees with respect to the second heat dissipating portion 31, and a connecting tab portion 33 that connects the element mounting portion 29 and the second heat dissipating portion 31. The third heat dissipating portions 32, 32, . . . are positioned at regular intervals in the circumferential direction.

The element mounting portion 29 is formed with pin insertion holes 29*a*, 29*a*.

The first heat dissipating portions 30, 30 have lower end portions that are in respective abutting contact in the thickness direction with the third heat dissipating portions 32, 32.

The second heat dissipating portion 31 is formed with an insertion slit 31*a*.

The conductive member 23 is provided with a connecting portion 34 that is formed folded 90 degrees with respect to the second heat dissipating portion 31.

Both the conductive member 24 and the conductive member 25 are positioned on the same plane as the element mounting portion 29 of the conductive member 23, and have respective pin insertion holes 24*a*, 25*a*, 25*a*. The conductive member 24 is provided as an element mounting portion.

The conductive member 26 is formed from a planar portion 35 that is positioned on the same plane as the element mounting portion 29 of the conductive member 23, and a connecting portion 36 that is formed folded 90 degrees with respect to the planar portion 35. The planar portion 35 is formed with pin insertion holes 35*a*, 35*a*. The connecting portion 36 is inserted into the insertion slit 31*a* formed in the second heat dissipating portion 31 of the conductive member 23.

The first housing 27 is formed into a general disc shape, and has an outer circumferential surface that is provided with attachment projecting portions 27*a*, 27*a*, . . . that are spaced in the circumferential direction. A rear end portion of the outer circumferential surface of the first housing 27 is provided with retaining projections 27*b*, 27*b*, . . . that are spaced in the circumferential direction. Caulking pins 27*c*, 27*c*, . . . are provided on a front surface of the first housing 27. The first housing 27 is formed with first slits 27*d*, 27*d* and a second slit 27*e* that each run front to back therethrough.

The first heat dissipating portions 30, 30 of the conductive member 23 are respectively inserted from a front side into the first slits 27*d*, 27*d* of the first housing 27. The connecting portion 36 of the conductive member 26 is inserted from the front side into the second slit 27*e* of the first housing 27.

The caulking pins 27*c*, 27*c*, . . . of the first housing 27 are respectively inserted into the pin insertion holes 24*a*, 25*a*, 25*a*, 29*a*, 29*a*, 35*a*, 35*a*, and the conductive members 23, 24, 25, 26 are joined to the first housing 27 by heat caulking, for example. The second heat dissipating portion 31 of the conductive member 23 is in abutting contact with a rear surface of the first housing 27.

In a state where the conductive members 23, 24, 25, 26 are joined to the first housing 27, the terminal portions 7*b*, 7*b* of the semiconductor light emitting element 7 are respectively joined by laser welding, for example, to the element mounting portion 29 of the conductive member 23 and the conductive member 24. Also, in the state where the conductive members 23, 24, 25, 26 are joined to the first housing 27, a protective element 37 is joined so as to bridge the conductive member 24 and the conductive member 25, and a resistive element 38 is joined so as to bridge the conductive member 25 and the planar portion 35 of the conductive member 26.

The second housing 28 is formed by integrating a holding portion 39 that has a shallow plate shape opening forward, and cover portions 40, 40, . . . that project rearward from the holding portion 39.

The holding portion 39 has a holding recess portion 39*a* opening forward, and a pressing surface 41 that faces forward is provided on an outer circumferential portion of the holding recess portion 39*a*. The pressing surface 41 is positioned slightly more toward the front side than a bottom surface of the holding recess portion 39*a*. An inner circumferential surface of the holding portion 39 is formed with retaining grooves 39*b*, 39*b*, . . . that are spaced in the circumferential direction at positions that are on an immediate forward side of the pressing surface 41.

The holding portion 39 is formed with heat dissipating slits 39*c*, 39*c*, . . . and connecting slits 39*d*, 39*d*, . . . that each run front to back therethrough.

The cover portions 40, 40 are formed into a plate shape. At positions that are on an immediate outer side of the heat dissipating slits 39*c*, 39*c*, . . . , the cover portions 40, 40 are respectively provided spaced in the circumferential direction. The cover portions 40, 40, . . . are formed with insertion holes 40*a*, 40*a*, . . . that each run front to back therethrough.

The first housing 27 is inserted from the front side into the holding recess portion 39*a* and joined to the second housing 28. When inserting the first housing 27 into the holding recess portion 39*a*, each of the retaining projections 27*b*, 27*b*, . . . slidingly contacts the inner circumferential surface of the holding portion 39 and elastically deforms so as to become displaced toward the inner side. When the elastically deformed retaining projections 27*b*, 27*b*, . . . are respectively positioned against the retaining grooves 39*b*, 39*b*, . . . , the retaining projections 27*b*, 27*b*, . . . elastically return and are retained by the retaining grooves 39*b*, 39*b*, . . . .

As described above, by retaining the retaining projections 27*b*, 27*b*, . . . in the retaining grooves 39*b*, 39*b*, . . . , the first housing 27 is joined to the second housing 28.

Thus, in the light source unit 6B, when the first housing 27 is inserted into the holding portion 39, the retaining projections 27*b*, 27*b*, . . . are respectively retained by the retaining grooves 39*b*, 39*b*, . . . and the first housing 27 is joined to the second housing 28. Therefore, an operation to join the first housing 27 to the second housing 28 can be easily accomplished.

In a state where the first housing 27 is joined to the second housing 28 as described above, the first heat dissipating portions 30, 30 and the third heat dissipating portions 32, 32, . . . are respectively inserted into the heat dissipating slits 39*c*, 39*c*, . . . of the second housing 28, and the connecting portions 34, 36 are respectively inserted into the connecting slits 39*d*, 39*d* of the second housing 28.

In the state where the first housing 27 is joined to the second housing 28, the conductive member 23 is interposed between the pressing surface 41 of the second housing 28 and a lower surface of the first housing 27, and held by the holding portion 39 of the second housing 28.

The first heat dissipating portions 30, 30 and the third heat dissipating portions 32, 32, . . . are respectively inserted into the insertion holes 40*a*, 40*a*, . . . of the cover portions 40, 40, . . . of the second housing 28. Accordingly, when attaching the light source unit 6B to the lamp body 2 as described later, there is no risk of an operator performing the attachment operation coming into contact with the first heat dissipating portions 30, 30 and the third heat dissipating portions 32, 32, . . . formed of a metal material. Thus, improved safety when attaching the light source unit 6B to the lamp body 2 can be achieved.

In the state where the first housing 27 is joined to the second housing 28, a water-resistant rubber 42 is attached to a rear surface side of the holding portion 39. Notch portions 42*a*, 42*a*, . . . opening outward are formed spaced in the circumferential direction on the water-resistant rubber 42. The water-resistant rubber 42 is formed with slits 42*b*, 42*b* that run front to back therethrough.

The water-resistant rubber 42 is attached to the second housing 28 while in a state of abutment with a lower surface of the holding portion 39 such that the notch portions 42*a*, 42*a*, . . . are respectively fitted to the cover portions 40, 40, . . . . The connecting portion 34 of the conductive member 23 and the connecting portion 36 of the conductive member 26 are respectively inserted into the slits 42*b*, 42*b* of the water-resistant rubber 42.

The light source unit 6B configured as described above is inserted from behind into the attachment hole 5 formed in the attachment portion 4 of the lamp body 2, with the O-ring 16 arranged on a front surface of the holding portion 39 of the second housing 28. The light source unit 6B has a part on a front end side thereof inserted into the circular portion 5*a* of the attachment hole 5, and the attachment projecting portions 27*a*, 27*a*, . . . of the first housing 27 are respectively inserted into the projecting portions 5*b*, 5*b*, . . . of the attachment hole 5 (see FIG. 8).

In a state where the attachment projecting portions 27*a*, 27*a*, . . . are respectively inserted into the projecting portions 5*b*, 5*b*, . . . of the attachment hole 5, the O-ring 16 is pressed against the rear surface of the attachment portion 4, and in this state, the light source unit 6B is rotated with respect to the attachment portion 4 to attach the light source unit 6B to the lamp body 2.

In the state where the light source unit 6B is attached to the lamp body 2, the attachment portion 4 is interposed between the holding portion 39 of the second housing 28 and the attachment projecting portions 27*a*, 27*a*, . . . of the first housing 27 through the O-ring 16, thus securing a state of stable attachment of the light source unit 6B to the lamp body 2.

In the state where the light source unit 6B is attached to the lamp body 2, the connector 100 is connected to the connecting portions 34, 36.

In the state where the light source unit 6B is attached to the lamp body 2 as described above, current is supplied from the power supply circuit to the semiconductor light emitting element 7 through the connector and the conductive members 23, 24, 25, 26, such that light is radiated from the light emitting portion 7*a* of the semiconductor light emitting element 7.

Heat is generated in conjunction with the radiation of light when the semiconductor light emitting element 7 emits light. However, the generated heat passes from the element mounting portion 29 of the conductive member 23 through the first heat dissipating portions 30, 30, the second heat dissipating portion 31, and the third heat dissipating portions 32, 32, . . . , and is released to outside the lamp body 2 through the insertion holes 40*a*, 40*a*, . . . of the cover portions 40, 40, . . . .

In the light source unit 6B described above, the conductive members 23, 24, 25, 26 are formed by bending the metal plate. Therefore, the conductive members 23, 24, 25, 26 can be easily formed and the light source unit 6B can be reduced in weight.

As described above, the light source units 6, 6A, 6B have structures in which the conductive members 8, 8A, 23, 24, 25, 26 are formed into a predetermined three-dimensional shape by press working a conductive metal material, and held by the housings 9, 9A, the first housing 27, and the second housing 28, thus achieving a simplified structure.

In addition, the heat dissipating portions 11, 11A, the first heat dissipating portion 30, the second heat dissipating portion 31, and the third heat dissipating portion 32 are provided on the conductive members 8, 8A, 23, 24, 25, 26. Therefore, a high heat dissipating property can be secured when the semiconductor light emitting element 7 emits light.

Further, in the vehicular lamp 1 in which the light source units 6, 6A, 6B are attached to the lamp body 2 (or the reflector 2) as described above, it is also possible to achieve a simplified structure and a high heat dissipation property when the semiconductor light emitting element 7 emits light.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR LAMP
2 LAMP BODY
6 LIGHT SOURCE UNIT
7 SEMICONDUCTOR LIGHT EMITTING ELEMENT
8 CONDUCTIVE MEMBER
9 HOUSING
10 ELEMENT MOUNTING PORTION
11 HEAT DISSIPATING PORTION
15 CONNECTING PORTION
6A LIGHT SOURCE UNIT
8A CONDUCTIVE MEMBER
9A HOUSING
10A ELEMENT MOUNTING PORTION
11A HEAT DISSIPATING PORTION
18*a* ENGAGEMENT PROJECTING PORTION
19 CONNECTING PORTION
21*b* ENGAGEMENT GROOVE
8A' METAL PLATE
100 CONNECTOR
6B LIGHT SOURCE UNIT
23 CONDUCTIVE MEMBER
24 CONDUCTIVE MEMBER
25 CONDUCTIVE MEMBER
26 CONDUCTIVE MEMBER
27 FIRST HOUSING
28 SECOND HOUSING
29 ELEMENT MOUNTING PORTION
30 FIRST HEAT DISSIPATING PORTION
31 SECOND HEAT DISSIPATING PORTION
32 THIRD HEAT DISSIPATING PORTION
34 CONNECTING PORTION
36 CONNECTING PORTION
40 COVER PORTION
23' METAL PLATE

What is claimed is:

1. A light source unit comprising:

a semiconductor light emitting element that is a light source;

a plurality of conductive members formed into a predetermined three-dimensional shape by press working a conductive metal material, wherein at least one of the plurality of conductive members comprises:

an element mounting portion to which the semiconductor light emitting element is mounted and joined by welding, a heat dissipating portion that dissipates heat generated when the semiconductor light emitting element emits light, and a planar connecting portion that is plane-shaped to which a connector that supplies power to the semiconductor light emitting element is connected; and a housing formed of an insulating material, wherein the at least one of the plurality of conductive members is formed from a planar portion that is positioned on the same plane as the element mounting portion, and the connecting portion folded ninety degrees with respect to the planar portion, wherein the housing holds the plurality of conductive members in a spaced apart state, wherein the planar connecting portion projects rearward from the element mounting portion, and wherein the connector is connected to a power supply circuit.

2. The light source unit according to claim 1, wherein the conductive member is formed by bending a metal plate that is used as the conductive metal material.

3. The light source unit according to claim 1, wherein the housing is formed with an engagement groove, and wherein the conductive member is provided with an elastically deformable engagement projecting portion that engages with the engagement groove.

4. The light source unit according to claim 1, wherein the housing is provided with a cover portion that covers at least a part of the heat dissipating portion of the conductive member.

5. The light source unit according to claim 1, wherein the heat dissipating portion is planar in shape, and provided folded 90 degrees with respect to a plane defined by the element mounting portion.

6. The light source unit according to claim 1, wherein the heat dissipating portion is formed projecting rearward from the element mounting portion.

7. The light source unit according to claim 1, wherein the light source unit is configured to be inserted into an attachment hole formed in an attachment portion from behind a lamp body.

8. A vehicular lamp including a light source unit that is attached to one of a lamp body and a reflector, wherein the light source unit comprises:

a semiconductor light emitting element that is a light source;

a plurality of conductive members formed into a predetermined three-dimensional shape by press working a conductive metal material, wherein at least one of the plurality of conductive members comprises:

an element mounting portion to which the semiconductor light emitting element is mounted and joined by welding, a heat dissipating portion that dissipates heat generated when the semiconductor light emitting element emits light, and a planar connecting portion that is plane-shaped to which a connector that supplies power to the semiconductor light emitting element is connected; and a housing formed of an insulating material, wherein the housing holds the plurality of conductive members in a spaced apart state, wherein the at least one of the plurality of conductive members is formed from a planar portion that is positioned on the same plane as the element mounting portion, and the connecting portion folded ninety degrees with respect to the planar portion, wherein the planar connecting portion projects rearward from the element mounting portion, and wherein the connector is connected to a power supply circuit.

9. The light source unit according to claim 8, wherein the conductive member is formed by bending a metal plate that is used as the conductive metal material.

10. The light source unit according to claim 8, wherein the housing is formed with an engagement groove, and wherein the conductive member is provided with an elastically deformable engagement projecting portion that engages with the engagement groove.

11. The light source unit according to claim 8, wherein the housing is provided with a cover portion that covers at least a part of the heat dissipating portion of the conductive member.

12. The light source unit according to claim 8, wherein the heat dissipating portion is planar in shape, and provided folded 90 degrees with respect to a plane defined by the element mounting portion.

13. The light source unit according to claim 8, wherein the heat dissipating portion is formed projecting rearward from the element mounting portion.

14. The vehicular lamp according to claim 8, wherein the light source unit is inserted into an attachment hole formed in an attachment portion from behind the lamp body.

* * * * *